United States Patent [19]
Viswanathan et al.

[11] Patent Number: 6,163,806
[45] Date of Patent: Dec. 19, 2000

[54] SYSTEM AND METHOD FOR TRANSPARENT, GLOBAL ACCESS TO PHYSICAL DEVICES ON A COMPUTER CLUSTER

[75] Inventors: Srinivasan Viswanathan, Fremont; Siamak Nazari, Arcadia; Anil Swaroop, Loma Linda; Yousef Khalidi, Sunnyvale, all of Calif.

[73] Assignee: Sun Microsystems, Inc., Palo Alto, Calif.

[21] Appl. No.: 08/885,024

[22] Filed: Jun. 30, 1997

[51] Int. Cl.$^7$ ........................................ G06F 13/10
[52] U.S. Cl. ............................. 709/229; 709/169
[58] Field of Search ..................... 395/500, 701, 395/200.38, 600, 653, 706, 182.02; 364/200; 711/165; 707/10; 370/255, 331; 709/169, 229; 379/207

[56] References Cited

U.S. PATENT DOCUMENTS

| | | | |
|---|---|---|---|
| 4,851,988 | 7/1989 | Trottier et al. | 364/200 |
| 4,887,204 | 12/1989 | Johnson et al. | 364/200 |
| 5,442,690 | 8/1995 | Nazif et al. | 379/207 |
| 5,515,531 | 5/1996 | Fujiwwarra et al. | 395/600 |
| 5,557,775 | 9/1996 | Shedletsky | 395/500 |
| 5,642,511 | 6/1997 | Chow et al. | 395/701 |
| 5,761,505 | 6/1998 | Golson et al. | 395/653 |
| 5,778,226 | 7/1998 | Adams et al. | 709/169 |
| 5,812,852 | 9/1998 | Poulsen et al. | 395/706 |
| 5,825,759 | 10/1998 | Liu | 370/331 |
| 5,909,540 | 6/1999 | Carter et al. | 395/182.02 |
| 5,918,229 | 6/1999 | Davis et al. | 707/10 |

FOREIGN PATENT DOCUMENTS

0 780 778 A2  6/1997  European Pat. Off. ........ G06F 17/30

OTHER PUBLICATIONS

"Multiple Instances of a Device Driver In The Kernel", pp. 382–383, IBM Technical Disclosure Bulletin, vol. 32, No. 10B, Mar. 1990, © 1990 IBM Corp., Armonk, NY, US.

"A Comparison of Three Distributed File System Architectures: Vnode, Sprite, and Plan 9", by Brent Welch, pp. 175 to 199, XP 000577569, © 1994 The USENIX Association, Computing Systems, vol. 7, No. 2, Spring 1994.

Microsoft Business Systems Division, "Microsoft Windows NT™ Server Cluster Strategy: High Availability and Scalability with Industry–Standard Hardware" 1995, entire article.

S.R. Kleiman, Sun Microsystems, "Vnodes: An Architecture for Multiple File System Types in Sun UNIX", Jun. 1986, pp. 238–247, USENIX Conference Proceedings, published by USENIX, Institution of Sun Microsystems, Inc.

Langerman, Boykin, LoVerso, et al. "Virtual File System (VFS)" Winter 1990 USENIX Booklet, pp. 301–304.

*Primary Examiner*—Frank J. Asta
*Assistant Examiner*—Thong Vu
*Attorney, Agent, or Firm*—Pennie & Edmonds LLP

[57] ABSTRACT

A system and method are disclosed that provides transparent, global access to devices on a computer cluster. The present system generates unique device type (dev_t) values for all devices and corresponding links between a global file system and the dev_t values. The file system is modified to take advantage of this framework so that, when a user requests that a particular device, identified by its logical name, be opened, an operating system kernel queries the file system to determine that device's dev_t value and then queries the a device configuration system (DCS) for the location (node) and identification (local address) of a device with that dev_t value. Once it has received the device's location and identification, the kernel issues an open request to the host node for the device identified by the DCS. File system components executing on the host node, which include a special file system (SpecFS), handle the open request by returning to the kernel a handle to a special file object that is associated with the desired device. The kernel then returns to the requesting user a file descriptor that is mapped to the handle, through which the user can access the device.

18 Claims, 10 Drawing Sheets

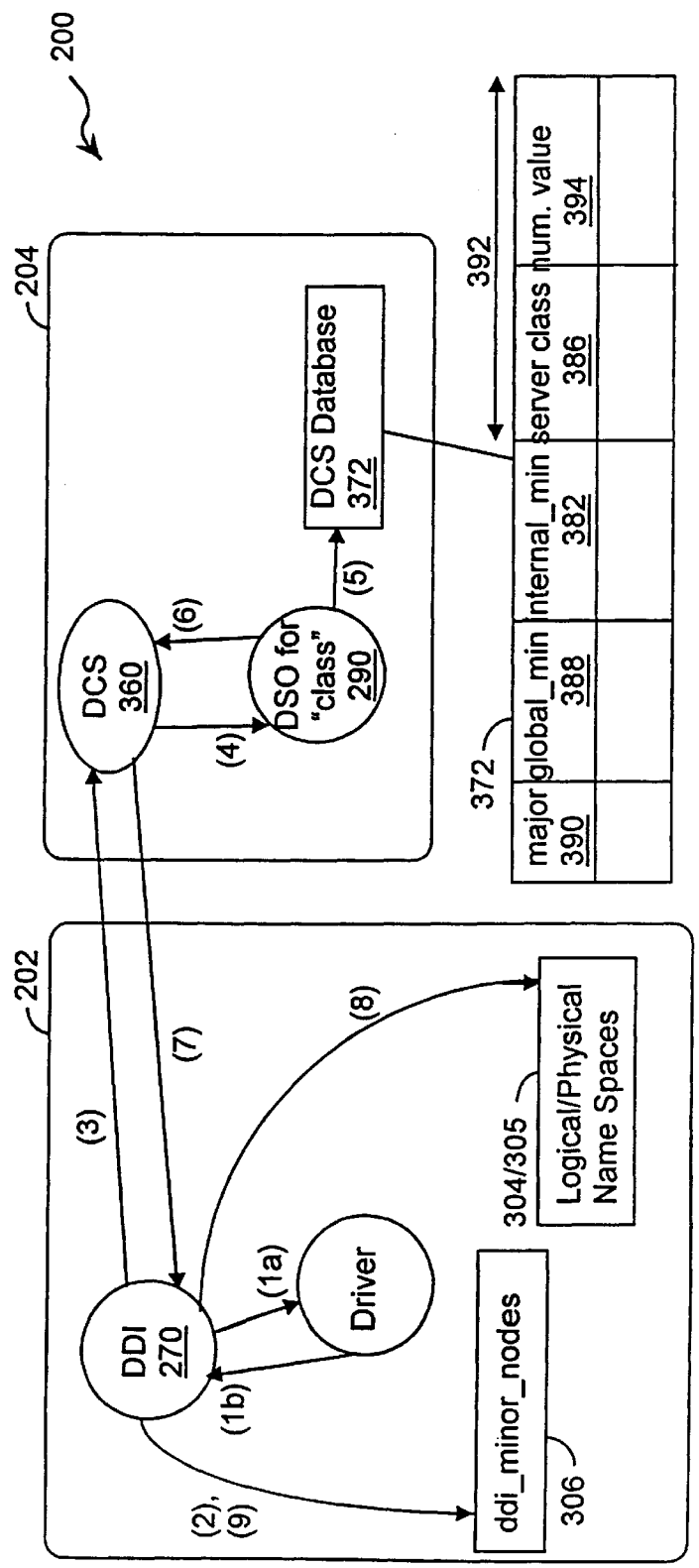

SYSTEM AND METHOD FOR TRANSPARENT, GLOBAL ACCESS TO PHYSICAL DEVICES ON A COMPUTER CLUSTER

The present invention relates generally to systems and methods for accessing physical devices attached to a computer and, particularly, to systems and methods for accessing physical devices on a computer cluster.

BACKGROUND OF THE INVENTION

It has become increasingly common for Unix-based computer applications to be hosted on a cluster that includes a plurality of computers. It is a goal of cluster operating systems to render operation of the cluster as transparent to applications/users as if it were a single computer. For example, a cluster typically provides a global file system that enables a user to view and access all conventional files on the cluster no matter where the files are hosted. This transparency does not, however, extend to device access on a cluster.

Typically, device access on Unix-based systems is provided through a special file system (e.g., SpecFS) that treats devices as files. This special file system operates only on a single node. That is, it only allows a user of a particular node to view and access devices on that node, which runs counter to the goal of global device visibility on a cluster. These limitations are due to the lack of coordination between the special file systems running on the various nodes as well as a lack of a device naming strategy to accommodate global visibility of devices. These aspects of a prior art device access system are now described with reference to FIGS. 1–4.

Referring to FIG. 1, there is shown a block diagram of a conventional computer system 100 that includes a central processing unit (CPU) 102, a high speed memory 104, a plurality of physical devices 106 and a group of physical device interfaces 108 (e.g., busses or other electronic interfaces) that enable the CPU 102 to control and exchange data with the memory 102 and the physical devices 106. The memory 102 can be a random access memory (RAM) or a cache memory.

The physical devices 106 can include but are not limited to high availability devices 112, printers 114, kernel memory 116, communications devices 118 and storage devices 120 (e.g., disk drives). Printers 114 and storage devices 120 are well-known. High availability devices 112 include devices such as storage units or printers that have associated secondary devices. Such devices are highly available as the secondary devices can fill in for their respective primary device upon the primary's failure. The kernel memory 116 is a programmed region of the memory 102 that includes accumulating and reporting system performance statistics. The communications devices 118 include modems, ISDN interface cards, network interface cards and other types of communication devices. The devices 106 can also include pseudo devices 122, which are software devices not associated with an actual physical device.

The memory 104 of the computer 100 can store an operating system 130, application programs 150 and data structures 160. The operating system 130 executes in the CPU 102 as long as the computer 100 is operational and provides system services for the processor 102 and applications 150 being executed in the CPU 102. The operating system 130, which is modeled on v. 2.6. of the Solaris™ operating system employed on Sun® workstations, includes a kernel 132, a file system 134, device drivers 140 and a device driver interface (DDI) framework 142. Solaris and Sun are trademarks and registered trademarks, respectively, of Sun Microsystems, Inc. The kernel 116 handles system calls from the applications 150, such as requests to access the memory 104, the file system 134 or the devices 106. The file system 134 and its relationship to the devices 106 and the device drivers 140 is described with reference to FIGS. 2A and 2B.

Referring to FIG. 2A, there is shown a high-level representation of the file system 134 employed by v. 2.6 and previous versions of the Solaris operating system. In Solaris, the file system 134 is the medium by which all files, devices 106 and network interfaces (assuming the computer 100 is networked) are accessed. These three different types of accesses are provided respectively by three components of the file system 134: a Unix file system 138u (UFS), a special file system 138s (SpecFS) and a network file system 138n (NFS).

In Solaris, an application 150 initially accesses a file, device or network interface (all referred to herein as a target) by issuing an open request for the target to the file system 134 via the kernel 132. The file system 134 then relays the request to the UFS 138u, SpecFS 138s or NFS 138n, as appropriate. If the target is successfully opened, the UFS, SpecFS or NFS returns to the file system 134 a vnode object 136 that is mapped to the requested file, device or network node. The file system 134 then maps the vnode object 136 to a file descriptor 174, which is returned to the application 150 via the kernel 132. The requesting application subsequently uses the file descriptor 174 to access the corresponding file, device or network node associated with the returned vnode object 136.

The vnode objects 136 provide a generic set of file system services in accordance with a vnode/VFS interface or layer (VFS) 172 that serves as the interface between the kernel 132 and the file system 134. Solaris also provides inode, snode and mode objects 136i, 136s, 136r that inherit from the vnode objects 136 and also include methods and data structures customized for the types of targets associated with the UFS, SpecFS and NFS, respectively. These classes 136i, 136s and 136r form the low level interfaces between the vnodes 136 and their respective targets. Thus, when the UFS, SpecFS or NFS returns a vnode object, that object is associated with a corresponding inode, snode or rnode that performs the actual target operations. Having discussed the general nature of the Solaris file system, the focus of the present discussion will now shift to the file-based device access methods employed by Solaris.

Referring to FIG. 2B, Solaris applications 150 typically issue device access requests to the file system 134 (via the kernel 132) using the logical name 166 of the device they need opened. For example, an application 150 might request access to a SCSI device with the command: open(/dev/dsk/disk_logical_address).

The logical name, /dev/dsk/disk_logical_address, indicates that the device to be opened is a disk at a particular logical address. In Solaris, the logical address for a SCSI disk might be "c0t0d0sx", where "c0" represents SCSI controller 0, t0 represents target 0, d0 represents disk 0, and sx represents the xth slice for the particular disk (a SCSI disk drive can have as many as eight slices).

The logical name is assigned by one of the link generators 144, which are user-space extensions of the DDI framework 142, and is based on information supplied by the device's driver 140 upon attachment of the device and a corresponding physical name for the device generated by the DDI framework 142. When an instance of a particular device driver 140 is attached to the node 100, the DDI framework 142 calls the attach routine of that driver 140. The driver 140 then assigns a unique local identifier to and calls the ddi__create__minor__nodes method 146 of the DDI framework 142 for each device that can be associated with that instance. Typically, the unique local identifier constitutes a minor name (e.g., "a") and a minor number (e.g., "2"). Each time it is called, the ddi__create__minor__nodes method 146 creates a leaf node in the DevInfo tree 162 that represents a given device. For example, because a SCSI drive (i.e., instance) can have up to eight slices (i.e., devices), the local SCSI driver 140 assigns unique local identifiers to each of the eight slices and calls the ddi__create__minor__nodes method 146 with the local identifiers up to eight times.

Also associated with each device 106 is a UFS file 170 that provides configuration information for the target device 106. The name of a particular UFS file 170i is the same as a physical name 168i derived from the physical location of the device on the computer. For example, a SCSI device might have the following physical name 168, /devices/iommu/sbus/esp1/sd@addr:minor__name, where addr is the address of the device driver sd and minor__name is the minor name of the device instance, which is assigned by the device driver sd. How physical names are derived is described below in reference to FIG. 3.

To enable it to open a target device given the target device's logical name, the file system 134 employs a logical name space data structure 164 that maps logical file names 166 to physical file names 168. The physical names of devices 106 are derived from the location of the device in a device information (DevInfo) tree 140 (shown in FIG. 1), which represents the hierarchy of device types, bus connections, controllers, drivers and devices associated with the computer system 100. Each file 170 identified by a physical name 168 includes in its attributes an identifier, or dev__t (short for device type), which is uniquely associated with the target device. This dev__t value is employed by the file system 134 to access the correct target device via the SpecFS 138s. It is now described with reference to FIG. 3 how dev__t values are assigned and the DevInfo tree 140 maintained by the DDI framework 142.

Referring to FIG. 3, there is shown an illustration of a hypothetical DevInfo tree 162 for the computer system 100. Each node of the DevInfo tree 162 corresponds to a physical component of the device system associated with the computer 100. Different levels correspond to different levels of the device hierarchy. Nodes that are directly connected to a higher node represent objects that are instances of the higher level object. Consequently, the root node of the DevInfo tree is always the "/" node, under which the entire device hierarchy resides. The intermediate nodes (i.e., nodes other than the leaf and leaf-parent nodes) are referred to as nexus devices and correspond to intermediate structures, such as controllers, busses and ports. At the next to bottom level of the DevInfo tree are the device drivers, each of which can export, or manage, one or more devices. At the leaf level are the actual devices, each of which can export a number of device instances, depending on the device type. For example, a SCSI device can have up to seven instances.

The hypothetical DevInfo tree 162 shown in FIG. 3 represents a computer system 100 that includes an input/output (i/o) controller for memory mapped i/o devices (iommu) at a physical address addr0. The iommu manages the CPU's interactions with i/o devices connected to a system bus (sbus) at address addr1 and a high speed bus, such a PCI bus, at address addr2. Two SCSI controllers (esp1 and esp2) at respective addresses addr3 and addr4 are coupled to the sbus along with an asynchronous transfer mode (ATM) controller at address addr5. The first SCSI controller esp1 is associated with a SCSI device driver (sd) at address 0 (represented as @0) that manages four SCSI device instances (dev0, dev1, dev2, dev3). Each of these device instances corresponds to a respective slice of a single, physical device 106. The first SCSI controller esp1 is also associated with a SCSI device driver (sd) at address 1 that manages plural SCSI device instances (not shown) of another physical device 106.

Each type of device driver that can be employed with the computer system 100 is assigned a predetermined, unique major number. For example, the SCSI device driver sd is assigned the major number 32. Each device is associated with a minor number that, within the group of devices managed by a single device driver, is unique. For example, the devices dev0, dev1, dev2 and dev3 associated with the driver sd at address 0 have minor numbers 0, 1, 2 and 3 and minor names a, b, c, d, respectively. Similarly, the devices managed by the driver sd at address 1 would have minor numbers distinct from those associated with the devices dev0–dev3 (e.g., four such might have minor numbers 4–7). The minor numbers and names are assigned by the parent device driver 140 (FIG. 1) for each new device instance (recall that a SCSI instance might be a particular SCSI drive and a SCSI device a particular slice of that drive). This ensures that each device exported by a given device driver has a unique minor number and name. That is, a driver manages a minor number-name space.

Each minor number, when combined with the major number of its parent driver, forms a dev__t value that uniquely identifies each device. For example, the devices dev0, dev1, dev2 and dev3 managed by the driver sb at address 0 have respective dev__t values of (32,0), (32,1), (32,3) and (32,3). The SpecFS 138s maintains a mapping of dev__t values to their corresponding devices. As a result, all device open requests to the SpecFS identify the device to be opened using its unique dev__t value.

The DevTree path to a device provides that device's physical name. For example, the physical name of the device dev0 is given by the string:

/devices/iommu@addr0/sbus@addr1/esp1@addr3/sd@0:a, where sd@0:a refers to the device managed by the sd driver at address 0 whose minor name is a; i.e., the device dev0. The physical name identifies the special file 170 (shown in FIG. 2) (corresponding to an snode) that holds all of the information necessary to access the corresponding device. Among other things, the attributes of each special file 170 hold the dev__t value associated with the corresponding device.

As mentioned above, a link__generator 144 generates a device's logical name from the device's physical name according to a set of rules applicable to the devices managed by that link generator. For example, in the case of the device dev0 managed by the driver sd at address 0, a link generator for SCSI devices could generate the following logical name, /dev/dsk/c0t0d0s0, where c0 refers to the controller esp1@addr3, t0 refers to the target id the physical disk managed by the sd@0 driver, d0 refers to the sd@0 driver and s0 designates the slice with minor name a and minor number 0. The device dev0 associated with the sd@1 driver could be assigned the logical name, dev/dsk/c0t1d1s4, by the same link generator 144. Note that the two dev0 devices have logical names distinguished by differences in the target, disk and slice values. It is now described with reference to FIG. 4 how this infrastructure is presently employed in Solaris to enable an application to open a particular device residing on the computer 100.

Referring to FIG. 4, there is shown a flow diagram of operations performed in the memory 104 of the computer 100 by various operating system components in the course of opening a device as requested by an application 150. The memory 104 is divided into a user space 104U in which the applications 150 execute and a kernel space 104K in which the operating system components execute. This diagram shows with a set of labeled arrows the order in which the operations occur and the devices that are the originators or targets of each operation. Where applicable, dashed lines indicate an object to which a reference is being passed. Alongside the representation of the memory 104, each operation associated with a labeled arrow is defined. The operations are defined as messages, or function calls, where the message name is followed by the data to be operated on or being returned by the receiving entity. For example, the message (4-1), "open(logical_name)," is the message issued by the application 150 asking the kernel 132 to open the device represented in the user space 104U by "logical_name". In this particular example, the application is seeking to open the device dev2.

After receiving the open message (4-1), the kernel 132 issues the message (4-2), "get_vnode(logical_name)," to the file system 134. This message asks the file system 134 to return the vnode of the device dev2, which the kernel 132 needs to complete the open operation. In response, the file system 134 converts the logical name 166 to the corresponding physical name 168 using the logical name space 164. The file system 134 then locates the file designated by the physical name and determines the dev_t value of the corresponding device from that file's attributes. Once it has acquired the dev_t value, the file system 134 issues the message (4-3), "get_vnode(dev_t)," to the SpecFS 138s. This message asks the SpecFS 138s to return a reference to a vnode linked to the device dev2. Upon receiving the message (4-3) the SpecFS 138s creates the requested vnode 136 and an snode 136s, which links the vnode 136 to the device dev2, and returns the reference to the vnode 136 (4-4) to the file system 134. The file system 134 then returns the vnode reference to the kernel (4-5).

Once it has the vnode reference, the kernel 132 issues a request (4-6) to the SpecFS 138s to open the device dev2 associated with the vnode 136. The SpecFS 138s attempts to satisfy this request by issuing an open command (4-7) to driver 2, which the SpecFS knows manages the device dev2. If driver 2 is able to open the device dev2, it returns an open_status message (4-8) indicating that the open operation was successful. Otherwise, driver 2 returns a failure indication in the same message (4-8). The SpecFS 138s then returns a similar status message (4-9) directly to the kernel 132. Assuming that "success" was returned in message (4-9), the kernel 132 returns a file descriptor to the application 150 that is a user space representation of the vnode 136 linked to the device dev2 (4-10). The application 150, once in possession of the file descriptor, can access the device dev2 via the kernel 132 and the file system 134 using file system operations. For example, the application 150 performs inputs data from the device dev2 by issuing read requests directed to the returned file descriptor. These file system commands are then transformed into actual device commands by the SpecFS 136s and the vnode and snode objects 136, 136s that manage the device dev2.

Consequently, Solaris enables users of a computer system 100 to access devices on that system 100 with relative ease. However, the methods employed by Solaris do not permit users to transparently access devices across computers, even when the different computers are configured as part of a cluster. That is, an application running on a first computer cannot, using Solaris, transparently open a device on a second computer.

The reason that the current version of Solaris cannot provide transparent device access in the multi-computer situation has to do with the way the dev_t and minor numbers are currently assigned when devices are attached. Referring again to FIG. 3, each time a device is attached to the computer 100 the device's associated driver assigns that device a minor number that is unique within the set of devices controlled by that driver and therefore can be mapped to a unique dev_t value for the computer 100 when combined with the driver's major number. However, if the same devices and driver were provided on a second computer, the driver and devices would be assigned a similar, if not identical, set of major and minor numbers and dev_t values. For example, if both computers had a SCSI driver sd (major num=32) and four SCSI device instances managed by the SCSI driver sd, each driver sd would allocate the same set of minor numbers to their local set of SCSI devices (e.g., both sets would have minor numbers between 0 and 3). Consequently, keeping in mind that a device is accessed according to its dev_t value, if a first node application wanted to open a SCSI disk on the second node, that application would not be able to unambiguously identify the SCSI disk to the SpecFS on either computer system.

Therefore, there is a need for a file-based device access system that enables applications, wherever they are executing, to transparently access devices resident on any node of a computer cluster.

SUMMARY OF THE INVENTION

In summary, the present invention is a system and method that provides transparent, global access to devices on a computer cluster.

In particular, the present invention includes a common operating system kernel running on each of the nodes composing the cluster, a file system running on all of the nodes; a device driver interface (DDI) running on each of the nodes, a device configuration system (DCS) running on one of the nodes, a DCS database accessible to the DCS and a plurality of device drivers located on each of the nodes.

Each of the device drivers manages one type of physical device and is associated with a unique, predetermined, major number. When a new device of a particular type is attached to a respective node, an attach message is issued to that node's DDI indicating configuration information of the device being attached. The DDI, using the configuration information, creates a physical name in the file system name space for the device and a logical name that is a symbolic link to the physical name. The logical name for the device can subsequently be used to access the device via the file system.

As part of creating the logical name the DDI issues a map request to the DCS to request a global minor (gmin) number for the attached device. The map request message includes, among other things, the major number and at least a subset of the configuration information.

In response to the map request, the DCS is configured to:
 (a) determine the gmin number,
 (b) return the gmin number to the DDI, and
 (c) store the gmin number, the major number and the subset of the configuration information.

The requesting DDI then forms the logical name and derives a dev_t value associated with the device using the returned gmin number and updates local device information so that the device's dev_t value is accessible from the file system.

By providing a unique dev_t value for all devices and a link between the file system and that dev_t value, the present invention provides a global framework that enables devices on different nodes to be globally accessible. The file system is modified to take advantage of this framework so that, when a user requests that a particular device, identified by its logical name, be opened, the kernel queries the file system to determine that device's dev_t value and then queries the DCS for the location and identification of a device with that dev_t value. Once it has received the device's location and identification, the kernel issues an open request to the host node for the device identified by the DCS. File system components executing on the host node, which include a special file system (SpecFS), handle the open request by returning to the kernel a handle to a special file object that is associated with the desired device. The kernel then returns to the requesting user a file descriptor that is mapped to the handle, through which the user can access the device.

In a preferred embodiment, the DCS, file system, user and device being requested can all be on different nodes. To function in this environment the present invention includes a proxy file system, which enables the users of a cluster node to communicate transparently with file objects co-located with a requested device on another node.

The present invention can also include a set of device server objects (DSOs) on each node of the cluster, each of which manages a particular class of devices. The respective device classes capture the particularity with which a user's request to open a particular device must be satisfied by the transparent, global device access system, in general, and the DCS, in particular. In a preferred embodiment there are four device classes: dev_enumerate, dev_node_specific, dev_global and dev_nodebound.

The dev_enumerate class is associated with devices that can have multiple instances at a particular node that are enumerated by their associated driver when each device is attached (e.g., multiple SCSI disks). The dev_node_specific class is associated with devices of which there is only one instance per node (e.g., kernel memory) and, as a result, are not enumerated by their drivers. The dev_global class is for those devices that can be accessed either locally or remotely using a driver that is resident on each node (e.g., modems and network interfaces). The dev_nodebound class is used for devices that can only be accessed using a driver on a particular node and, if that particular node becomes unavailable, then by a driver on another node (e.g., highly available devices).

When classes are employed, the device configuration information issued by the driver to the DDI preferably includes the device's class. If available, the DDI includes this class information in its map request to the DCS. Upon receiving a map request including class information, the DCS consults its local DSO for that class. That DSO then determines the gminor number that should be assigned to the device being attached. For example, the DSO for the dev_enumate class assigns each dev_enumerate device a gmin number that is unique across the cluster because each enumerated device must be accessed at a specific node. In contrast, the DSO for the dev_global class assigns each global device the same gmin value because it is immaterial at which node such devices are accessed. As for the other classes, the DSO for the dev_node specific class assigns each device of that class the same, non-null gmin value, and the DSO for the dev_nodebound class assigns each device of that class a gmin number that is unique across the cluster.

If the class information is not provided by a driver, the present invention treats the corresponding device as if it were of the dev_enumerate class or the dev_global class depending on whether it is a physical device (dev_enumerate) or a pseudo device (dev_global).

BRIEF DESCRIPTION OF THE DRAWINGS

Additional objects and features of the invention will be more readily apparent from the following detailed description and appended claims when taken in conjunction with the drawings, in which:

FIG. 7A is a flow diagram that illustrates the operations by which the device driver interface (DDI) Framework and the device configuration system (DCS) establish an appropriate dev_t value, logical name and physical name for a device being attached to the node 202;

DESCRIPTION OF THE PREFERRED EMBODIMENT

Figure 5:
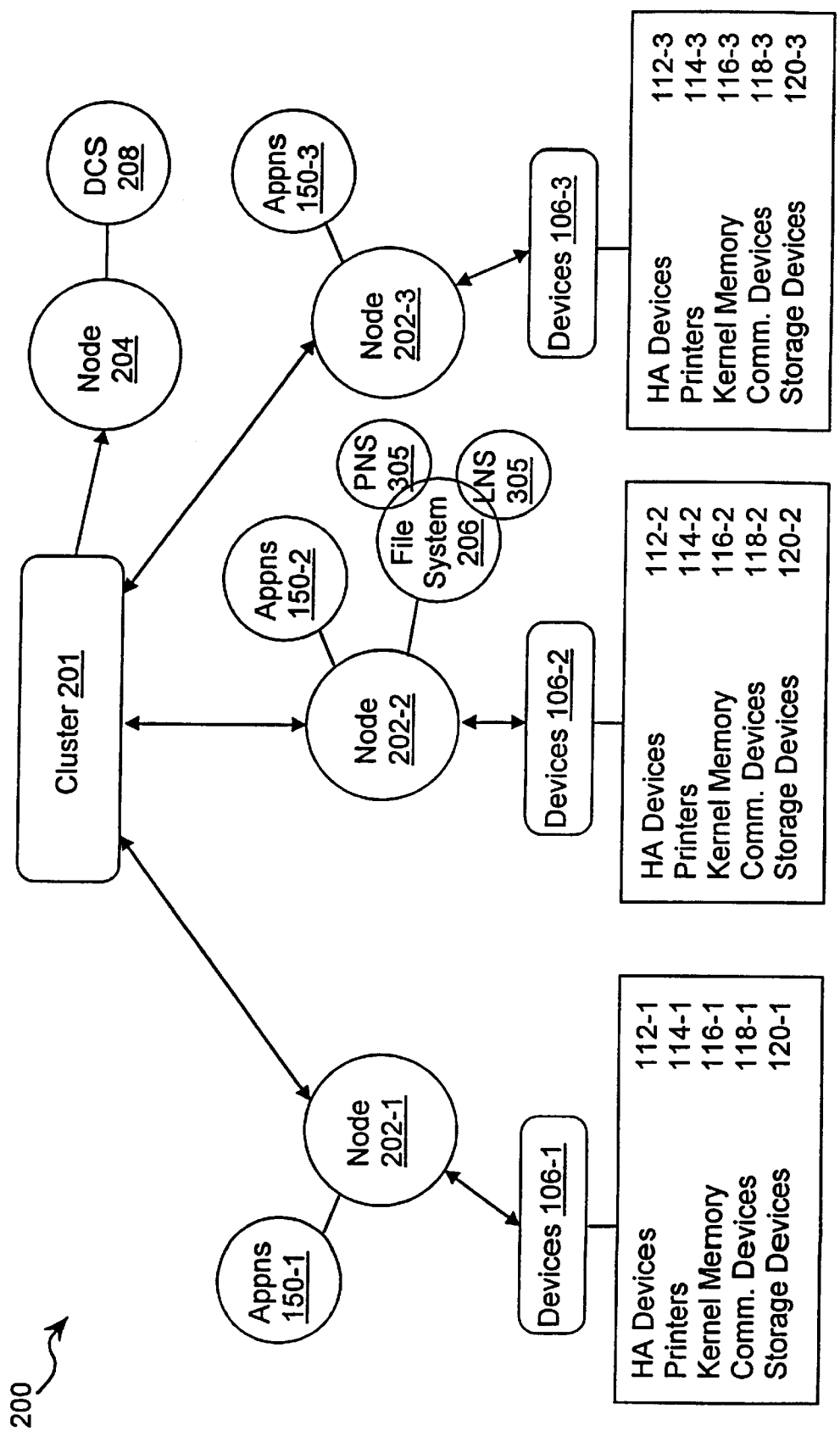
FIG. 5 is a block diagram of a computer cluster in which the present invention can be implemented.

Referring to FIG. 5, there is shown a block diagram of a computer cluster 210 in which the present invention can be implemented. The cluster 201 includes a plurality of nodes 202 with associated devices 106 and applications 150. As in FIG. 1, the devices 106 can include high availability devices 112, printers 114, kernel memory 116, communication devices 118 and storage devices 120. For the purposes of the present discussion a global file system 206, which maintains a single, global file space for all files stored on the cluster 201, runs on one of the nodes 202. The global file system 206 supports at least two representations of the devices 106. The physical name space (PNS) representation 305 is accessible from kernel space and corresponds to the physical arrangement of the device 106 on the respective nodes 202. The logical name space (LNS) representation 304 is a user space version of the physical name space 305; i.e., each entry in the logical name space 304 maps to a corresponding entry in the physical name space 305. The present invention modifies many aspects of this global file system 206 to allow transparent, global access to the devices 106 by the applications 150. The cluster 201 also includes a node 204 that hosts a device configuration system (DCS) 208 that is a key component of the present invention.

In other embodiments there might be any number of global file systems 206, each of which maintains its own physical and logical name spaces. In such an environment a particular device is accessed through only of the global file systems 206 and its associated physical and logical name spaces.

As described above in reference to FIGS. 1–4, the prior Solaris device access system allows transparent device access only within a single computer system. Certain aspects of the way in which the prior art generates the logical names that are mapped by the file system to the dev_t value of the device to be accessed are not compatible with extending the current device access system to a cluster. For example, assuming that the sets of devices 106-1, 106-2 each included four SCSI disk drives, the logical naming system presently employed would result in different drives on the different nodes 106-1, 106-2 having the same dev_t value. This would make it impossible for an application 150-1 to access transparently a specific one of the disk drives on the node 202-2. It is now described how the present invention provides such transparent, global device access.

Figure 6:
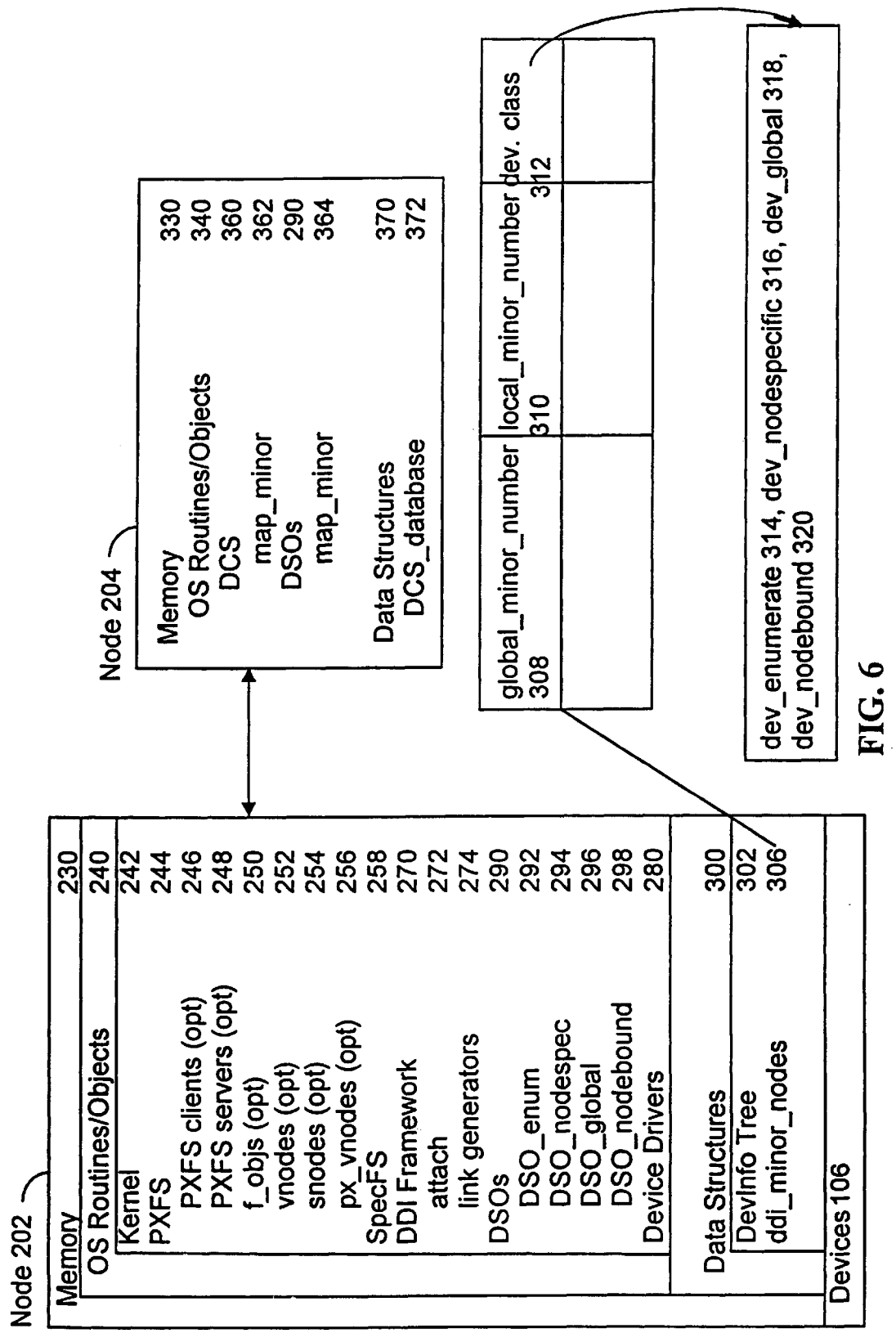
FIG. 6 is a block diagram of memory programs and data structures composing the present invention as implemented in representative nodes 202 and 204 of the cluster of FIG. 5.

Referring to FIG. 6, there are shown additional details of a representative one of the nodes 202 and the node 204, which hosts the DCS 208. The file system 206 is not shown in this figure as it resides only on one particular node 202-2. Each node 202 includes a memory 230 in which operating system (OS) routines/objects 240 and data structures 300 are defined. The OS routines 240 include an operating system kernel 242, a proxy file system (PXFS) 244, a special file system 258, a device driver framework (DDI) 270, a set of device server objects (DSO) and device drivers 280.

As described above, the kernel 242 handles system calls from the applications 150, such as requests to access the memory 230, the file system 206 or the devices 106. The kernel 242 differs from the kernel 132 (FIG. 1) as it has been modified by the present invention to support global device access. The proxy file system (PxFS) 244 is based on the Solaris PxFS file system but, like the kernel 242, is modified herein to support global device access. The PxFS 244 includes a collection of objects that enable an application 150-i in one node 202-i to interact seamlessly with the file system 206 across different nodes 202. The PxFS objects include PxFS clients 246, PxFS servers 248, f_objs (file objects) 250, vnodes (virtual file nodes) 252, snodes (special file nodes) 254 and px_vnodes (proxy vnodes) 256. Each of these objects is labeled in FIG. 6 as optional (opt) as they are created as needed by the PxFS 244 in response to operations of the file system 206.

Figure 1:
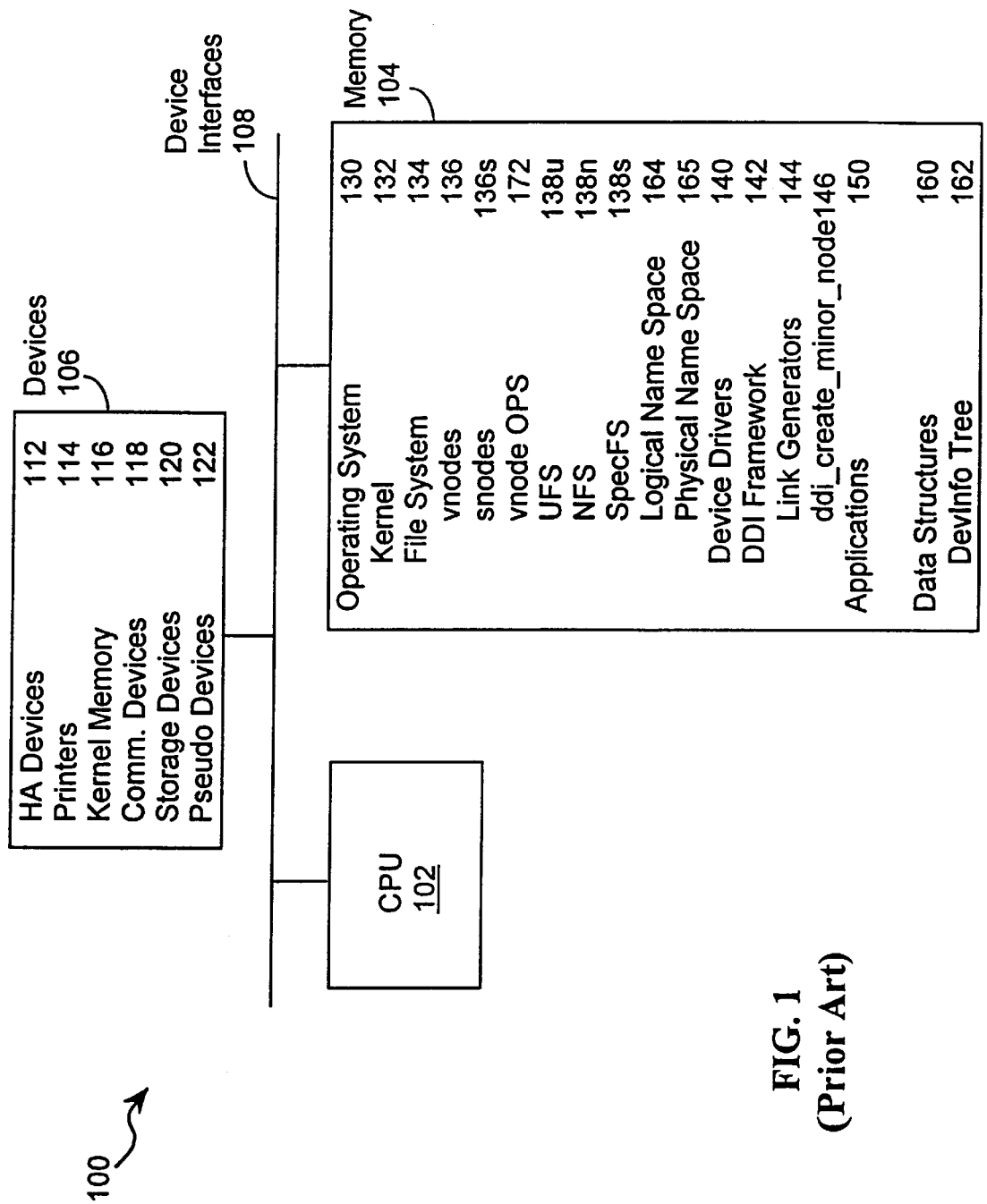
FIG. 1 is a block diagram of a prior art computer system showing components used to provide access to devices on a single computer.
Figure 2:
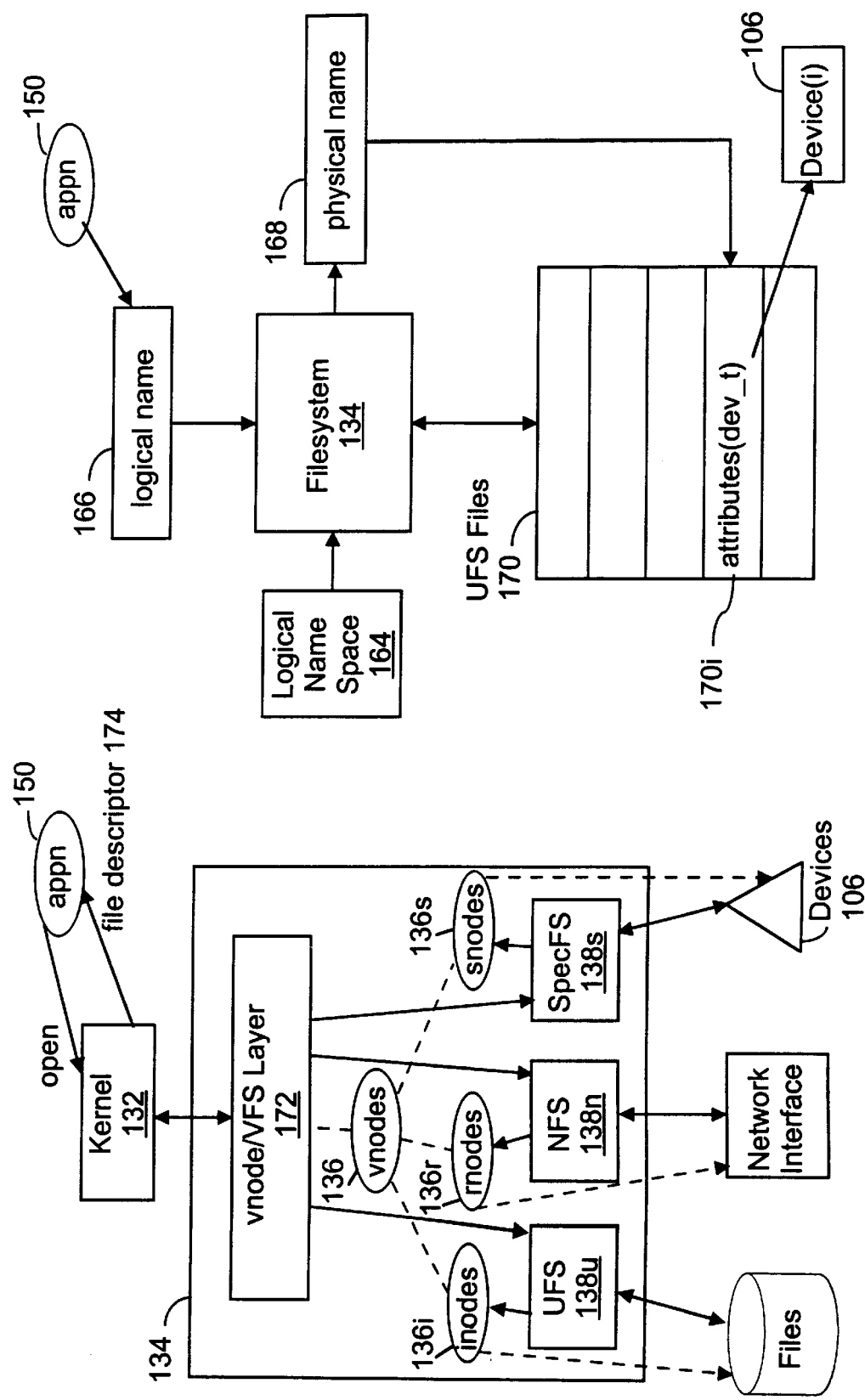
FIG. 2A is a block diagram showing the relationships in the prior art between applications, the operating system kernel, the file system and the devices.
FIG. 2B is a block diagram showing the relationships in the prior art between device logical names, physical names, the file system, device type identifiers (dev_t) and devices.

The DDI framework 270 (hereinafter referred to as the DDI) is also similar to the DDI framework 142 described in reference to the prior art (FIG. 1). However, the DDI framework 270 is modified in the present invention to interact with the DCS 360 and to generate physical and logical names that are compatible with devices 106 that can be accessed on and from different nodes 202. The DDI 270 includes an attach method 272 that is called every time a new device is attached to the local node 202. In contrast to the prior attach method, the attach method 272 is configured to employ the services of the DCS 360 to create a globally consistent physical name for each and every attached device. The DDI framework 270 also includes a collection of link generators 274 that generate unique logical names from corresponding the physical names. There is different type of link generator for each different type of device 106. Thus, the attach routine 272 and the link generators 274 respectively build the physical and logical name spaces that render the devices 106 globally visible at the kernel and user levels, respectively.

The present invention includes a set of DSOs 290 on each node of the cluster 200, each of which manages a particular class 312 of devices 106. The respective device classes are a new aspect of the present invention that capture the particularity with which a user's request to open a particular device 106 must be satisfied by the transparent, global device access system, generally, and the DCS 372, in particular. In the preferred embodiment there are four device classes: dev_enumerate 314, dev_node_specific 316, dev_global 318 and dev_nodebound 320; and four corresponding DSOs 290: DSO_enum 292, DSO_nodespec 294, DSO_global 296 and DSO_nodebound 298.

The dev_enumerate class 314 is associated with devices 106 that can have multiple instances at a particular node 202 that are enumerated by their associated driver 280 when each device is attached (e.g., multiple storage devices 120). The dev_nodespecific class 316 is associated with devices 106 of which there is only one instance per node (e.g., the kernel memory 116) and, as a result, are not enumerated by their drivers 280. The dev_global class 318 is for those devices 106 that can be accessed either locally or remotely using a driver that is resident on each node (e.g., communication devices 118). The dev_nodebound class is used for devices that can only be accessed using a driver on a particular node (e.g., HA devices 112).

The drivers 280 are similar to the drivers 140 except they report additional configuration information including, when available, the device class information 312 for each object being attached.

The data structures 300 include a DevInfo tree 302 and a ddi_minor_nodes table 306. Like many of the OS routines 240, the data structures 300 are similar to like-named data structures 160 used by the prior art (FIG. 1). Each, however, embodies important differences over the prior art that enable operation of the present invention. In particular, the DevInfo tree 302 includes additional intermediate nodes required to locate devices of selected classes within the cluster 200. As a result of changes to the physical name space 305, which is represented by the DevInfo tree, the logical name space 304 is also different from the prior art logical name space 164. Finally, the ddi_minor_nodes table 306 includes additional fields as compared to the ddi_minor_nodes table employed by the prior art. For example, the present ddi_minor_nodes table includes global_minor_number, local_minor_number and (device) class fields 308, 310 and 312 (described above); the prior art ddi_minor_nodes table did not include either of the fields 308 or 312.

The node 204 includes a memory 330 in which are defined OS routines/objects 340 and data structures 370. The OS routines/objects 340 include the device configuration system (DCS) 360, a map_minor method 362 on the DCS and a set of DSOs 290 identical to those already described. The data structures 370 include a DCS database 372.

The DCS 360, for which there is no analog in the prior art, serves at least two important functions. First, the DCS 360 works with the DDls 270 to assign global minor numbers to newly attached devices that allow those devices to be globally and transparently accessible. Second, the DCS 360 works with the file system 206 and PxFS 244 to enable applications 150 to access transparently the attached devices 106. The DCS_database 372 holds in persistent storage all important results generated by the DCS 372. The two aspects of the DCS 360 are now described below in reference to FIGS. 7A–B and 8A–B, respectively.

Figure 7B:
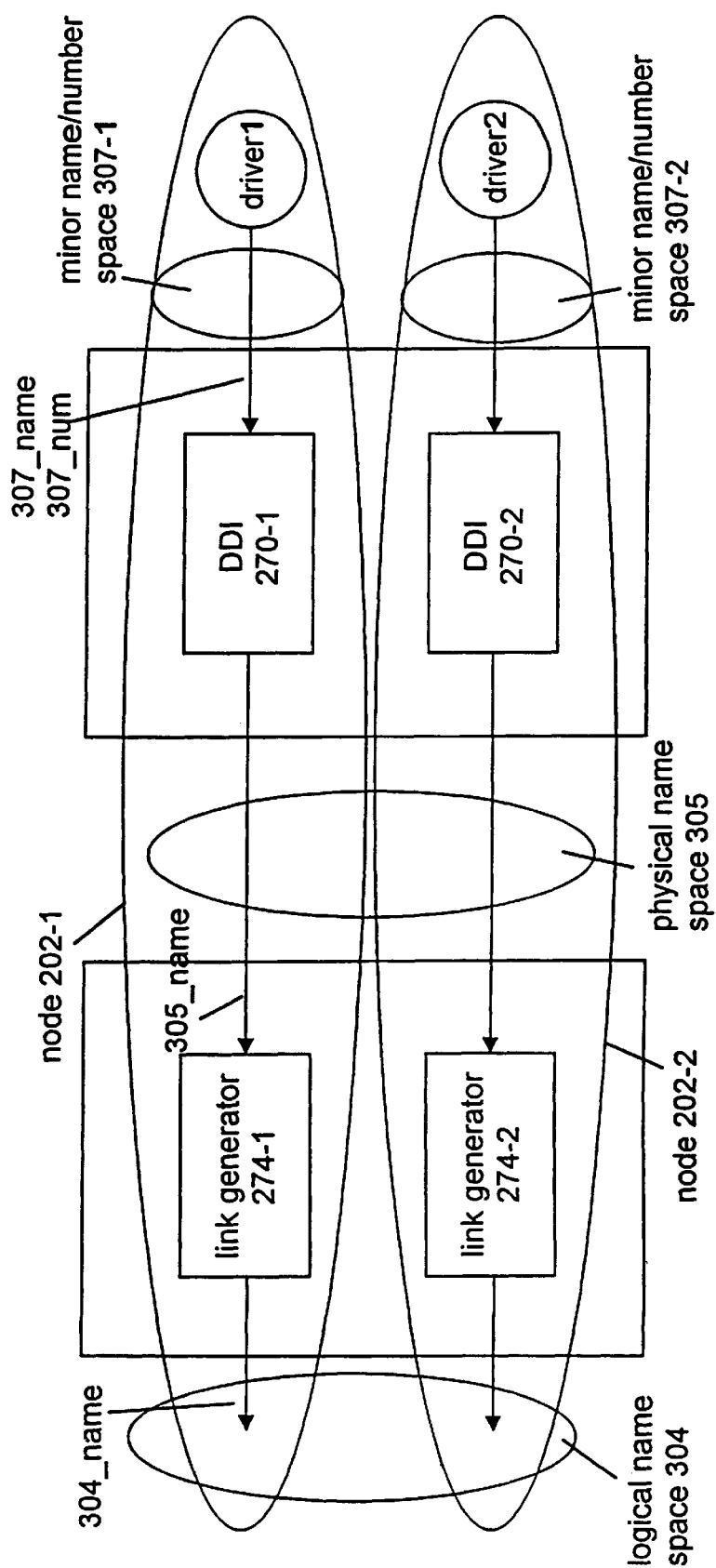
FIG. 7B illustrates the relationship between the local minor name/number, physical name and logical name established by the present invention.

Referring to FIG. 7A, there is shown a flow diagram that illustrates the operations by which the DDI Framework in a node 202 and the DCS 360 in the node 204 establish an appropriate dev_t value, logical name and physical name for a device 380 being attached to the node 202. Collectively, the DDIs 270, the link generators 274, the DCS 360, and extensions thereof act as a device registrar for the cluster 200. The operations and messages are indicated in the same manner as in FIG. 4A. Before describing the operations represented in the flow diagram, the relationship between some of the name spaces managed by the present invention are is described with reference to FIG. 7B.

Referring to FIG. 7B, there is shown a conceptual diagram of the minor name/number space 307, physical name space 305 and logical name space 304 employed in the present invention for an exemplary cluster including two nodes 202-1, 202-2. As is described below, each time a device 106 is attached to a node 202 its driver assigns it a local minor number 307_num and name 307_name. The DDI 270 uses this information to generate a globally unique minor number and to form a globally unique physical name 305_name for the device 106. The physical name 305_name locates the device in the cluster's device hierarchy. The link generators 274 then map the physical name 305_name to a globally unique logical name 304_name. Note that the DDIs 270-1, 270-2 and the link generators 274-1, 274-2 jointly generate common global physical and logical name spaces 305, 304, respectively. In contrast, each driver generates a minor name/number space only for its node 202. Thus, the present invention maps local minor names/numbers to global physical and logical names. These global name spaces are a part of the file system 206. Consequently, an application 150 on any node 202 can employ the file system 206 to view and access all of the devices 106 on the cluster 200 as if they were situated on a single computer. Having described the name spaces that form its framework, the present invention is now described with reference to FIG. 7A.

Referring to FIG. 7A, when the device 106 is attached to the node 202 the DDI 270 issues an attach message (7-1a) to the driver 280. In return the driver 280 issues a create_ddi_minor_nodes message (7-1b) to the DDI 270 for each device associated with the just attached instance. The create_ddi_minor_nodes message (7-1b) indicates the configuration of the device, including a local minor number (minor_num) 382 and minor_name 384 assigned by the appropriate device driver 280 and a device_class 386 selected from one of the classes 312. For example, if the device were the third SCSI disk drive attached to the node 202, the minor_num, minor_name and class might be "3",, "a" (indicating that it is the first slice on that device) and "dev_enumerate", respectively.

In response to the create_minor_nodes message (7-1b) the DDI 270 updates the ddi minor_nodes table 306 by setting the local_minor_num field 310 equal to the minor_num value 382 (7-2). The DDI 270 then issues a dc_map_minor message (7-3) to the DCS 360 asking the DCS 360 to return an appropriate global minor number 388 for the device. What is meant in the previous sentence by "appropriate" depends on the device class. That is, dev_enumerate and dev_nodebound devices require unique global minor numbers 388 and dev_global and dev_nodespecific devices do not. The dc_map_minor message (7-3) has three fields: (1) "gminor", which is a return field for the global minor number 388 generated by the DCS 360; (2) "Iminor", which holds the local minor number 384 generated by the device driver 280; and (3) "class", which holds the device class 386 generated by the device driver 280. In response to the map_minor message (7-3) the DCS 360 issues a similar ds_map_minor message (7-4) to the local DSO 290 for the class identified in the message (7-3).

The DSO 290, among other things, determines the global minor (gmin) number 388 that should be assigned to the device being attached. How the gmin number is assigned depends on the class 386 of the device. For example, the DSO 292 for the dev_enumerate class 314 assigns each dev_enumerate device a gmin number 388 that is unique across the cluster because each enumerated device must be accessed at a specific node. In contrast, the DSO 296 for the dev_global class 318 assigns each dev_global device the same gmin number as it is immaterial at which node such devices are accessed. As for the other classes, the DSO 294 for the dev_node specific class 316 assigns each device of that class the same, non-null gmin number and the DSO 298 for the dev_nodebound class 320 assigns each device of that class a gmin number that is unique across the cluster.

The DSOs 292, 298 assign global minor numbers by first consulting the DCS database 372 to determine which global minor numbers are still available.

The DCS database 372 is held in persistent storage and includes, for all devices 106 in the cluster 200, fields for major number 390, global minor number 388, internal (or local) minor number 382 and device server id 392 (comprising server class 386 and numerical value 394). The minor name, major number, global minor number and local minor number have already been described. The numerical value 394 identifies the node 202 that is the server for the device being attached. This information is optional for dev_global and dev_nodespecific devices as the identity of a server for the first class is irrelevant and, for the second case, is the same as the location of whatever node wishes to access the device. An example of the DCS database 272 is shown in Table 1.

TABLE 1

| device (not a field) | major 390 | global minor 388 | internal minor 382 | device server id 392: server class 386 | numerical value 394 |
|---|---|---|---|---|---|
| tcp | 42 | 0 | 0 | dev_gobal | 0 |
| kmem spec | 13 | 12 | 12 | dev_node_ | 0 |
| disk c2t0d0s0 | 32 | 24 | 24 | dev_enum | node id |
| kmem | 13 | 1 | 12 | dev_enum | node 0 id |
| kmem | 13 | 2 | 12 | dev_enum | node 1 id |
| kmem | 13 | 3 | 12 | dev_enum | node 2 id |
| kmem | 13 | 4 | 12 | dev_enum | node 3 id |
| HA devices | M | X1 | x1 | dev_nodebound | id |

The first line of Table 1 shows an entry for a tcp interface. A tcp interface is a dev_global device as it can be accessed from every node 202 in the cluster 200. The tcp device has a major number of 42, which is the value associated with all tcp drivers. Note that its global and local minimum values 388, 382 and server numerical value 394 (i.e., node_id) are set to 0. This is because it is immaterial from what node the tcp interface is accessed. Consequently, there is only one tcp entry in the DCS database for the entire cluster 200. The second entry in Table 1 is for a kernel memory device, which, by default, is accessed locally. For this reason, it is of the dev_nodespecific class. The major number 13 is associated with the kmem device driver. The kmem device has a null numerical value 394 as kmem devices are not accessed at any particular server and identical, non-null global and local minimum numbers (12). This is the case as, for dev_nodespecific devices the DCS 360 simply assigns a global minor number that is identical to the local minor number. In the present example, there is only one kmem entry of the dev_nodespecific variety in the DCS database 372 as there is no need to distinguish between the kmem devices located on respective nodes 202.

The third entry is for a SCSI disk c0t0d0t0 whose SCSI driver has major number 32. The DCS 360 has assigned the SCSI device a global minor number 388 that is identical to its local minor number 382 (24) as there are no other SCSI devices represented in the DCS database 372. However, if another SCSI device c0t0d0t0 were registered at a different node with the same local number (24), the DCS 360 would assign that SCSI a different global number, perhaps 25. To distinguish SCSI devices with the same local numbers, the DCS database 372 includes complete server information. In this case the numerical value 394 is set to the hostid of the server 202.

Entries four through seven are for four kernel memory devices that are registered as dev_enumerate devices. In the preferred embodiment, each time a dev_nodespecific device is registered, additional entries can be created in the DCS database 372 for all of the nodes 202 in the kernel, which allows a user to access a dev_nodespecific device on other than the local node. Consequently, assuming there are four nodes 202-1, 202-2, 202-3 and 202-4, the DCS 260 can register a kernel memory device of the dev_enumerate class for each of those nodes. As with other dev_enumerate devices, each kmem device is assigned a unique global number. The dev_enumerate information would not be used when a user issues a generic request to open a kernel memory device (e.g., open(/devices/kmem)). The dev_enumerate information would be used when a user issues a specific request to open a kernel memory device. For example, the request open(/devices/kmem0) allows a user to open the kmem device on node 0.

The final entry shows how a generic high availability (HA) device is represented in the DCS database 372. The major number 390, global minor number, and local minor number are taken from the values M, X1 and X1 provided in the map_minor nodes message. The numerical value 394 is set to the id of the device, which is bound to a particular node. This "id" is not a node id. Rather, the id is created uniquely for the cluster 200 for each HA service.

Once the global minor number 388 is determined for the device 380, the appropriate DSO 290 updates the DCS database 372 with the new information (7-5) and returns the global minor number 388 to the DCS 360 (7-6). The DCS 372 then returns the global minor number 388 to the DDI 270 (7-7), which updates the ddi_minor_nodes table 306 (7-9), the logical name space 304, the physical name space 305 and the dev_info tree 302 (7-9). The DDI 270 updates the ddi_minor nodes table 306 by writing therein the new global minor number 388. The update to the name spaces 304/305 is more complex and is now described.

Figure 3:
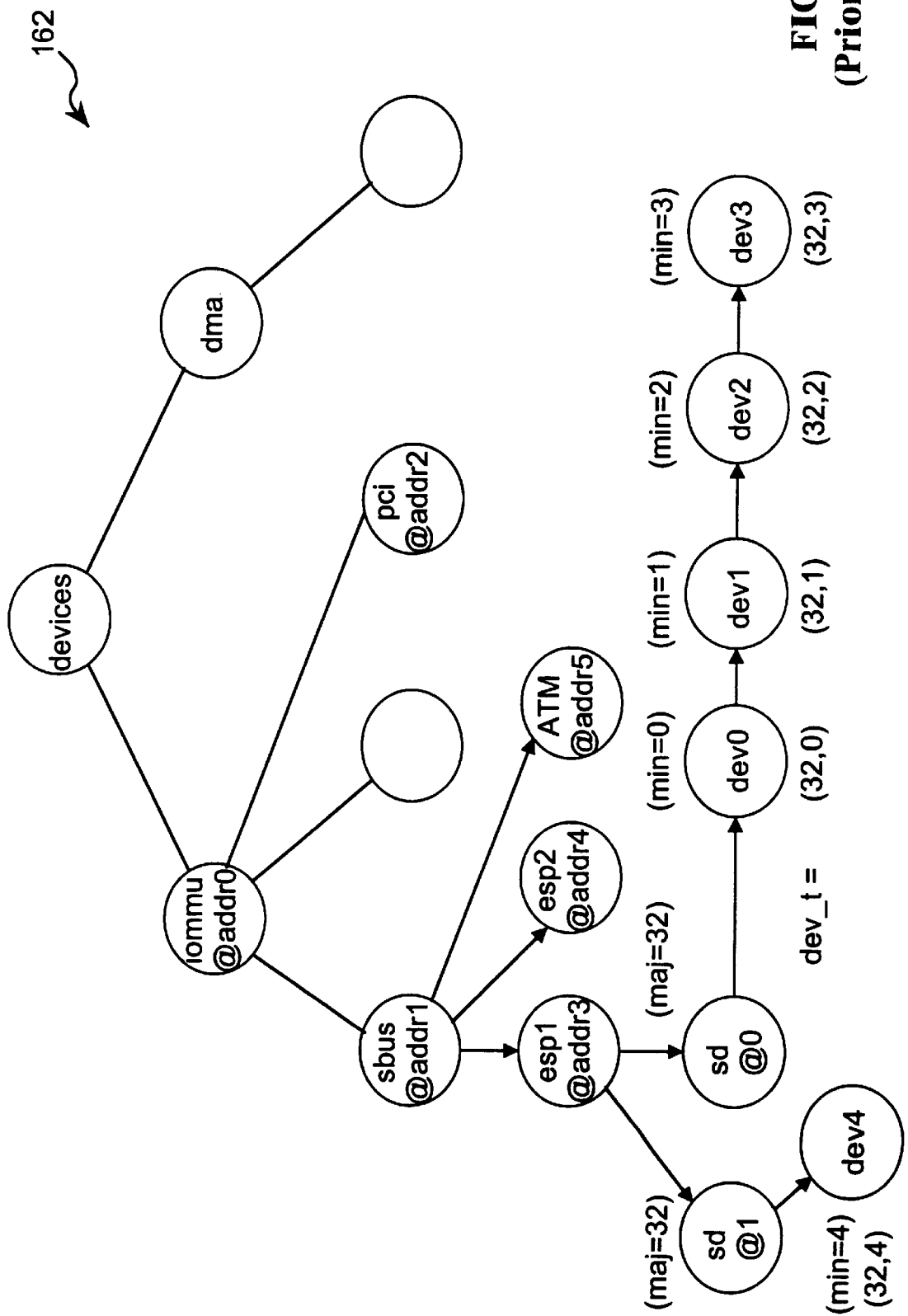
FIG. 3 is a diagram of an exemplary device information tree (DevInfo Tree) consistent with those employed in the prior art.
Figure 4:
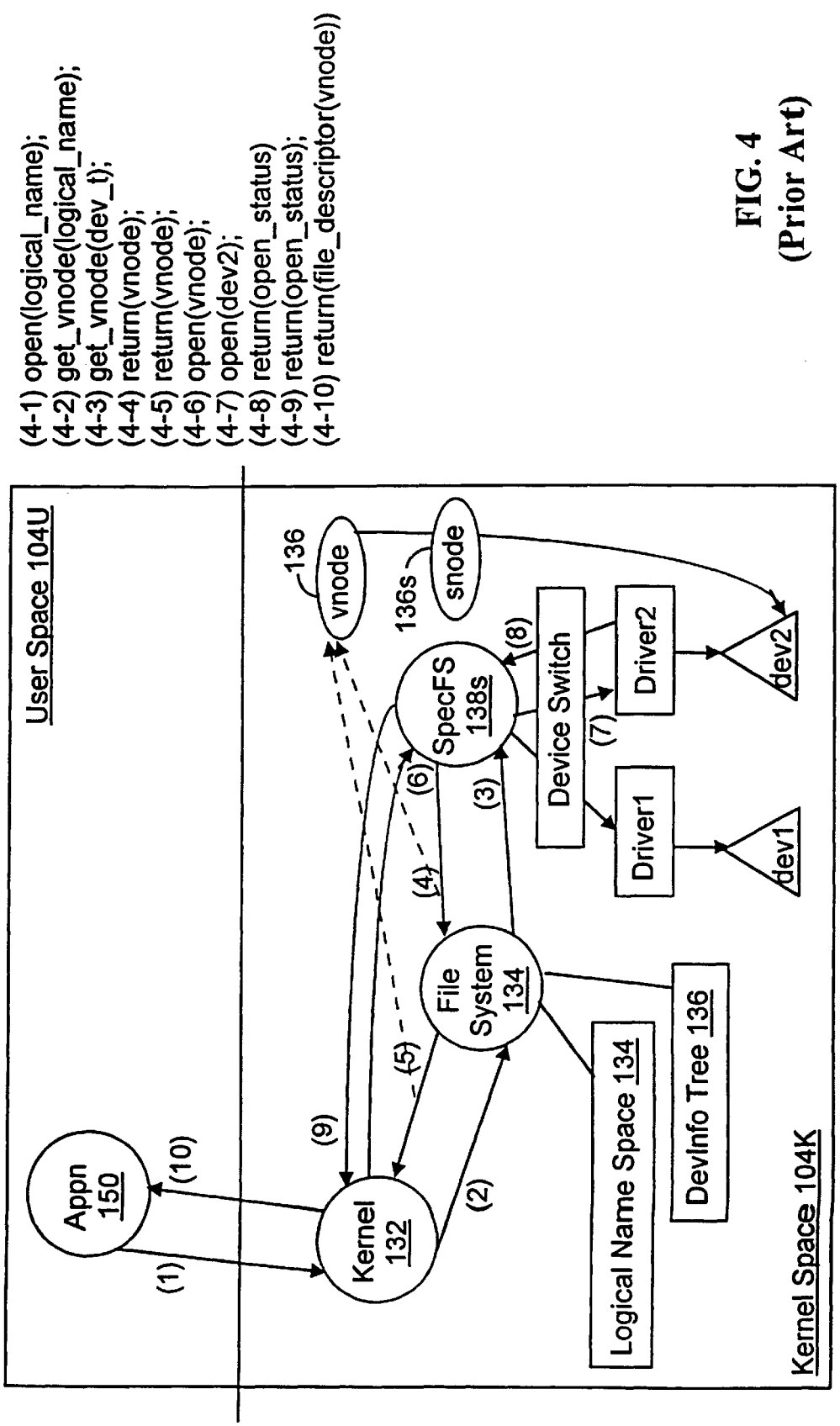
FIG. 4 is a flow diagram of operations performed in the memory 104 of the prior art computer system 100 in the course of opening a device as requested by an application 150.

First, the DDI 270 adds a new leaf node to the DevInfo tree 302, the structure of which is changed from that previously described in reference to FIG. 3 to include, just below the "/devices" node, an additional level of "/hostid" nodes to represent the cluster sites where dev_enumerate are attached. Note that each node 202 has its own DevInfo tree 270 that represents the devices on that node. However, as represented by the physical name space the collection of DevInfo trees is merged into a single representation with the additional /hostid nodes. (e.g., a typical physical name might start out with the string, /devices/hostid/ . . . ). Each device is also associated at the leaf level with its global minor number 388, not its local minor number 382. Where relevant (i.e., for dev_enumerate devices) the dev_t value of each leaf node of the DevInfo tree 302 is derived from the corresponding device's global minor number 388 and its driver's major number 390. For example, the physical path to a SCSI disk on a node 202-x with a global minor number GN, minor name MN, and driver sd@addry is represented in the present invention as:

/devices/node_202-x/iommu@addr/sbus@addr/esp@addr/sd@addry:MN.

This physical name corresponds to the physical name of the UFS file 170 (FIG. 2B) that includes configuration information for the given device including, in its attributes, the dev_t value derived from the major and global minor numbers.

The link generators 274 of the present invention derive a logical name for the device (and for the corresponding UFS) from at least a portion of the DevInfo path and the minor name provided by the driver modified in accordance with the global minor number returned by the DCS.

For example, assume that the node 202-1 has one SCSI disk with four slices originally assigned by its driver minor names a–d and minor numbers 0–3 and the node 202-2 has one SCSI disk with six slices assigned the minor names a–f and minor numbers 0–5. Assume that, when these devices are attached, the DCS 360 returns for the first SCSI disk global minor numbers of 0–3 and for the second SCSI disk global minor numbers of 4–9. Using these global minor numbers, the DDIs 270 create physical names (described below) and the link generators 274 use the DDIs 270 to create logical names that map to the physical names as follows::

| minor name from driver 280 | logical name from link generators 274 |
| --- | --- |
| a (node 202-1) | /dev/dsk/c0t0d0s0 |
| b (node 202-1) | /dev/dsk/c0t0d0s1 |
| c (node 202-1) | /devldsk/c0t0d0s2 |
| d (node 202-1) | /devldsk/c0t0d0s3 |
| a (node 202-2) | /dev/dsk/clt0d0s0 |
| b (node 202-2) | /dev/dsk/clt0d0sl |
| . . . | |
| f (node 202-2) | /devldsk/clt0d0s5 |

The logical names assigned to the node 202-1 and 202-2 devices have different cluster values (the cx part of the logical name string cxt0d0sy, where "x" and "y" are variables). This is because the logical names map to device physical names and, in a cluster, devices on different nodes are associated with different controllers. For example, the node 202-1 controller is represented as c0 and the node 202-2 controller as c1.

The DDIs 270 generate the physical name space 305 using the same gmin information and produce a map between logical names and physical names identifying files whose attributes contain the dev_t values for the corresponding devices. For the above example, the logical name space 304 and the logical name space to physical name space map is updated as follows (note that addr substitutes for any address):

| logical name | physical name from DevInfo tree 302 |
|---|---|
| /dev/dsk/c0t0d0s0 | /devices/node_202-1/iommu@addr/sbus@addr/es |
| /dev/dsk/c0t0d0s1 | p1@addr/sd@0:a/espl @addrlsd@O:b |
| /dev/dsk/c0t0d0s2 | p1@addr/sd@0:a/espl @addrlsd@O:c |
| /dev/dsk/c0t0d0s3 | p1@addr/sd@0:a/espl @addr/sd@O:d |
| /dev/dsk/c1t0d0s0 | /devices/node_202-2/iommu@addr/sbus@addr/es |
| /dev/dsk/c1t0d0sl | p1@addr/sd@0:minor/espl @addr/sd@O:e |
| /dev/dsk/clt0d0s2 | p1@addr/sd@0:minor/espl @addr/sd@O:f |
| ... | |
| /dev/dsk/c1t0d0s5 | p1@addr/sd@0:minor/esp 1 @adddsd@O:i |

The example just presented shows the DDIs 270 generate logical and physical names for dev_enumerate devices, of which class SCSI devices are a member. Briefly summarized, the rules for naming dev_enumerate devices require that each instance enumerated by a particular driver (e.g., sd) must have a unique global minor number, which, when combined with its driver's major number forms a corresponding, unique dev_t value. These rules also specify that the physical name associated with each instance must include the hostid of that instance and the instance's global minor number in addition to other traditional physical path information. The rules for naming the other devices from the other classes are similar to those described above for the dev_enumerate class.

In particular, the DDI 270 assigns a dev_nodespecific device a logical name of the form /dev/device_name and physical name of the form:

/devices/pseudo/driver@gmin:device_name, where device_name is the name 384, pseudo indicates that devices of this type are pseudo devices, driver is the id of the corresponding driver and @gmin:device_name indicates the global number 388 and device name 384 of the dev_nodespecific device. For example, the logical and physical names of a kernel memory device could be /dev/kmem and devices/pseudo/mm@12:kmem, respectively. As mentioned above, a kmem device can also be given a logical name that enables it to be accessed on a specific node. For example, the DDI 270 can map the logical name /dev/kmem0 to the physical name /devices/hostid0/pseudo/mm@0:kmem.

For the dev_global class each logical name generated by the DDI identifies a common physical path that will be resolved to any device in the cluster 200 by the file system. Logical names for these devices are of the form /dev/device_name and are mapped to physical names of the form:

/devices/pseudo/clone@gmin:device_name, where device_name is the name 384, which is specific to the driver, pseudo indicates that devices of this type are pseudo devices, clone indicates that the device is cloneable and @gmin:device_name indicates the global number 388 and device name 384 of the dev_global device. For example, the tcp device from Table 1 might have a logical name of /dev/tcp and a physical name of /devices/pseudo/clone@0:tcp. Note that the present invention does not allow any of dev_global devices to be made distinguishable, as in the case of the kmem devices, described above. That is, all dev_global devices are indistinguishable.

An advantage of the class-based naming system of the present invention is that it is compatible with legacy software designed for prior versions of Solaris. For example, a legacy program might issue an open(/dev/kmem) request, in which case a version of Solaris embodying the present invention returns a handle to the local kmem device. The present invention provides similar results for dev_global and dev_enumerate devices. There was no conception in the prior art for dev_nodebound devices.

Figure 8A:
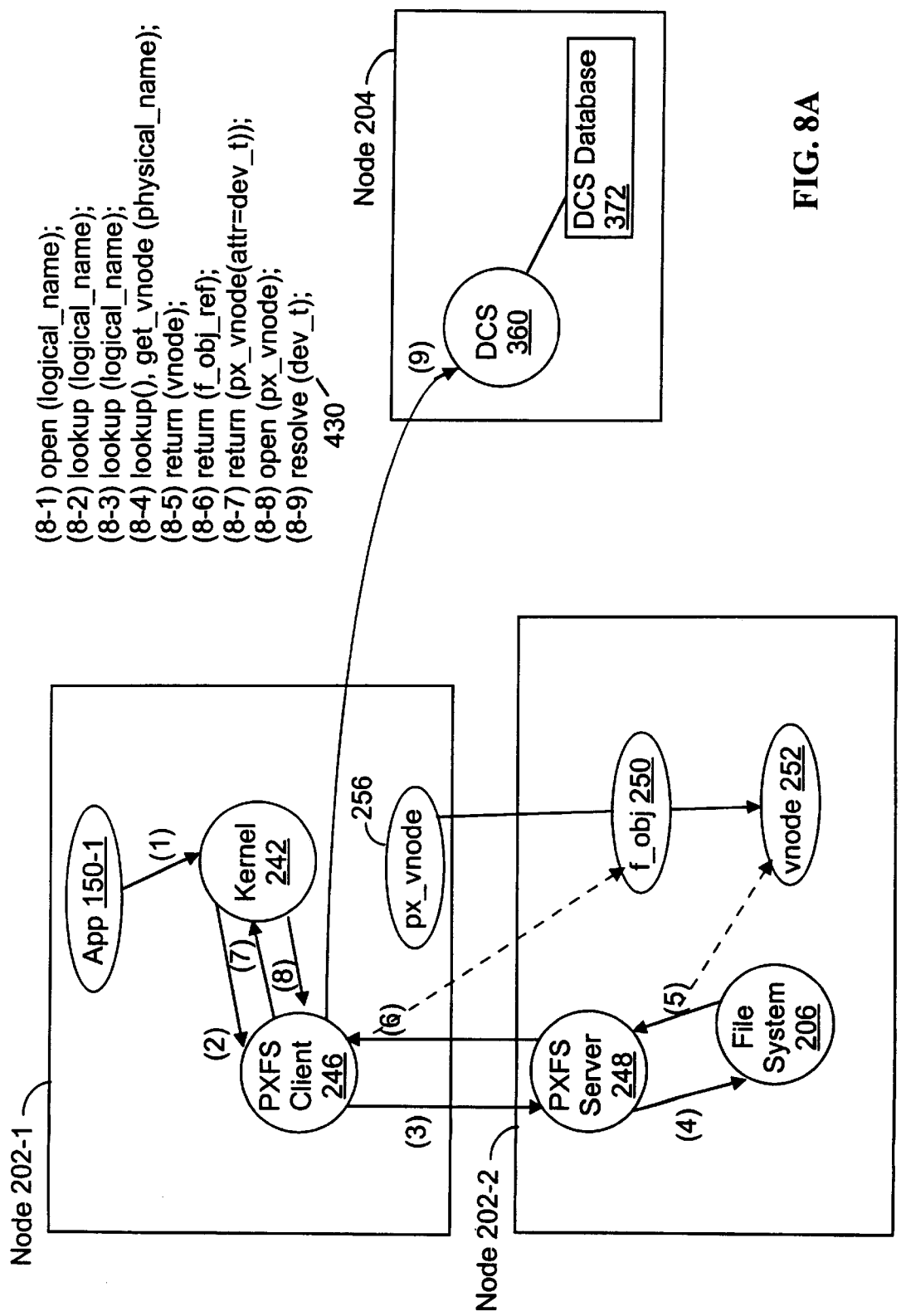
FIGS. 8A and 8B are flow diagrams that illustrate the steps performed by the present invention in response to a request from an application 150 executing on a node 202-1 to access (open) a device that resides on a node 202-3.

Having described how the DDI 270 and the DCS 360 form a consistent global name space in which different classes of devices can be accessed on different nodes of the cluster 200, the steps employed by the present invention to respond to an open request for a device on another node is now described in reference to FIGS. 8A and 9B.

Figure 8B:
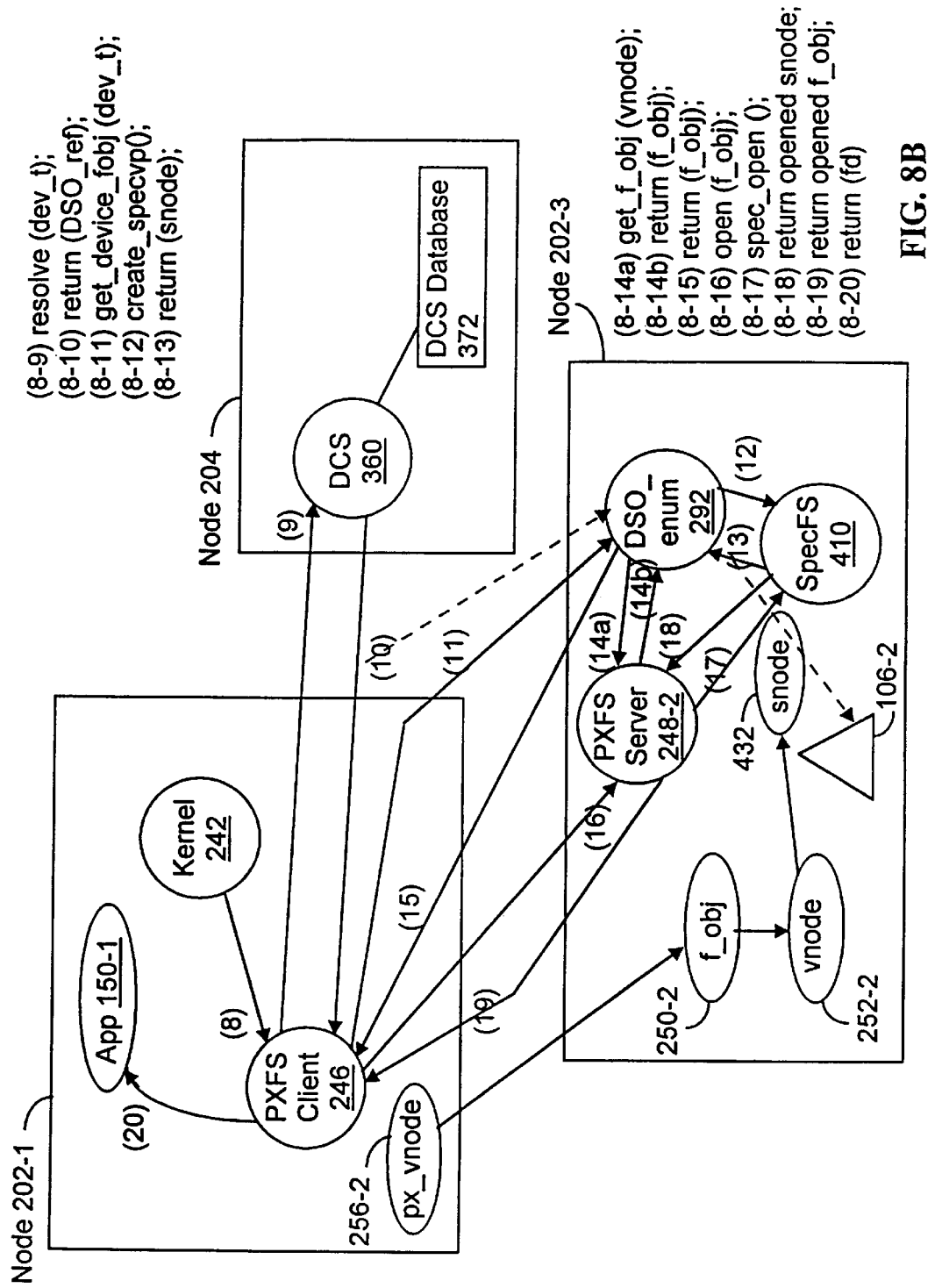

Referring to FIGS. 8A and 8B, there are shown flow diagrams of the steps performed by the present invention in response to a request (8-1) from an application 150 executing on a node 202-1 to access (open) a device 106-2 (FIG. 9B) that resides on a node 202-3. In this example, the file system 206 and the DCS 360 reside on the nodes 202-2 and 204, respectively. The application 150 issues the open request to the local 242 on the device's logical name. The kernel 242 then queries the file system 206 to determine the device's dev_t value. Because the file system is on a different node from the kernel 242, this is a multistep process that involves the use of a proxy file system PxFS, most aspects of which are already defined by current versions of Solaris. However, the present invention modifies such proxy file system elements as PxFS clients 246 and PxFS servers 248 to support interactions with the DCS 360, for which there is no analog in prior versions of Solaris. The interactions between the PxFS client 246, PxFS server 248 and the file system 206 are now briefly described.

An object such as the kernel 242 that needs to access the file system 206 first issues the access request to its local PxFS client 246. The PxFS client holds a reference to the PxFS server 248 co-located with the file system 206. This reference enables the PxFS client 246 to communicate the kernel's request to the file system 206 via the PxFS server 248. The file system 206 performs the requested access, creates a vnode object 252 representing the requested file and returns a reference to vnode object 252 to the PxFS server 248. Because the nodes 202-1 and 202-2 are different address spaces, the reference to the vnode 252 is useless to the PxFS client 246 and kernel 242 in the node 202-1. Consequently, the PxFS server 248 creates a file transport object (f_obj) 250 linked to the vnode 252 and returns a reference to the f_obj 150 to the PxFS client 246. Upon receiving the f_obj reference the PxFS client 246 creates a proxy vnode (px_vnode) 256 that is linked to the f_obj 250. The kernel 242 can then access the file information represented by the vnode 252 by simply accessing the local px_vnode 256.

Using this mechanism, the kernel 242 issues a lookup message (8-2) on the logical name of the device to be opened to the PxFS client 246, which relays a similar lookup message (8-3) to the PxFS sever 248. The PxFS server 248 issues the file system 206 a lookup(logical_name), get_vnode message (8-4), which asks the file system 206 to map the logical_name to the corresponding physical_name via a logical symbolic link return a reference to a v_node 252 representing the UFS file identified by that physical_name. When the physical_name refers to a device as in the present example, the attributes of the device include the unique dev_t of the device. As described above, the file system 206 then returns the vnode to the PxFS server 248 (8-5) and the PxFS server 248 creates a corresponding f_obj 250 and returns the f_obj 250 reference to the PxFS client 246 (8-6). The PxFS client 246 then creates a px_vnode 256 whose attributes include the dev_t information for the requested device and passes the px_vnode 256 reference to the kernel 242 (8-7). At this point, the kernel 242 issues an open message (8-8) to the PxFS client 246 for the px_vnode 246. Upon receiving this message, the PxFS client 246 determines from the px_vnode's attributes, which include a dev_t value, that the corresponding vnode 252 represents a device and therefore the open message must be handled by the DCS 360. If the px_vnode 256 did not contain a dev_t value, the PxFS client 246 would satisfy the open request (8-8) through other channels. As implemented in prior versions of Solaris, the PxFS client does not perform any testing for dev_t values as devices are only locally accessible.

Because the px_vnode 256 includes a dev_t value 430, the PxFS client 246 issues a resolve message (8-9) to the DCS 360 for the device corresponding to the dev_t. How the DCS 360 handles this request is now described in reference to FIG. 8B.

Referring to FIG. 8B, in response to the resolve(dev_t) message (8-9) the DCS 360 performs a lookup in the DCS database 372 to determine the location and identity of the device that corresponds to that dev_t value. Consistent with the preceding discussions of the device classes 312, devices of the dev_enumerate or dev_nodebound classes are accessed on a particular node whose location is specified in the numerical value field 394 of the DCS database 372. In contrast, devices of the dev_global or dev_nodespecific classes are accessed on the local node of the requesting application. Once it has determined the location of the device to be opened, the DCS 360 returns (8-10) to the PxFS client 246 a reference (DSO_ref) to the DSO 290 that manages the device class to which the requested device belongs and is local to the node that hosts the requested object. In the present example, assuming that the requested device 106-2 is of the dev_enumerate class and is hosted on the node 202-3, the returned DSO_ref would be to the DSO_enum object 292 on the node 202-3.

After receiving the message (8-10) the PxFS client 246 issues a get_device_fobj request for the device 106-2 to the referenced DSO 292 (8-11). In response, the DSO 292 issues a create_specvp() message (8-12) asking the SpecFS 410 on the node 202-3 to create and return (8-13) the snode for the device 106-2. The DSO 292 then requests (8-14a) the f_obj reference to the snode from the PxFS server 248-2, which returns the requested f_obj (8-14b). The DSO 292 then returns the fobj reference to the snode to the PxFS client 246 (8-15). The client 246 then issues an open request (8-16) on this fobj that goes to the SpecFS 410 via the PxFS server 248-2 (8-17).

The SpecFS 410 then attempts to open the device 106-2. Depending on the outcome of the open operation the SpecFS 410 returns a status message (8-18) indicating either success or failure. If the open was successful, the status message (8-18) also includes a reference to the opened snode 432. Upon receiving "success" in the status message (8-18) the PxFS server 248-2 creates the f_obj 250-2 for the opened v_node 252-2 and returns it back to the PxFS client 246 (8-19), which creates a px_vnode 256-2 that is linked across nodes to the f_obj 250-2. As the final step in the device open operation the PxFS client returns the px_vnode 256-2 to the kernel 242 (8-20), which creates a corresponding user space file descriptor (fd) 434. The kernel 242 returns this file descriptor to the application 150-1 (8-21), which can then use the file descriptor 434 to interact directly (i.e., via the kernel 242, PxFS client 246 and px_vnode) with the device 106-2.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system configured to provide global access to physical devices located on a computer cluster comprising a plurality of nodes, the system comprising:

a global file system;

a device configuration system (DCS), the DCS storing physical device information for a plurality of physical devices, the physical device information for each device in the plurality including a major number associated with a device type assigned to the physical device and other devices of same type, and a minor number that is globally unique for physical devices having the same major number;

the physical devices including a plurality of physical devices having a same major number associated therewith including at least one device having a first globally unique minor number associated therewith on a first node of the system and a second device having a second globally unique minor number associated therewith on a second node of the system;

at least one device server object (DSO) on each node of the system;

the global file system including an interface for responding to a request to access one such physical device issued from one of the nodes by sending a corresponding request to the DCS;

the DCS including an interface for responding to the request by returning information corresponding to the major number and globally unique minor number associated with the requested physical device, and also determining which node the physical device resides on and the DSO to use to access the physical device;

the global file system including means for using the information returned by the DCS to generate a file descriptor and for returning the file descriptor for subsequent use in accessing the requested physical device.

2. The system of claim 1, wherein the DCS is hosted on one of the nodes, the system further comprising:

a common operating system kernel running on each of the nodes in the computer cluster;

a device driver interface (DDI) running on each of the nodes; and a plurality of device drivers located on each of the nodes, each of the device drivers being configured to manage one type of physical device and being associated with a unique, major number;

each device driver being configured, when a new device of an appropriate type is attached to a respective node, to issue an attach message to the DDI indicating a local identifier (locid) of the new device being attached;

the DDI being configured, in response to the attach message, to issue a map request to the DCS for the unique global minor (gmin) number for the attached device, the map request indicating the major number and the locid of the device being attached;

the DCS being configured, in response to the map request, to (a) determine the gmin number, (b) return the gmin number to the DDI, and (c) store the gmin number, the major number and the gmin number;

the DDI being configured to associate the gmin number returned by the DCS and the major number with the attached device so that the attached device is accessible from the file system in response to a request to open the attached device.

3. The system of claim 1, wherein the DCS, file system and requested device are each on different nodes, the system further comprising a proxy file system enabling applications on one node to communicate transparently with file objects co-located with the requested device on another node.

4. The system of claim 1, wherein the at least one DSO comprises a set of device server objects on each node of the cluster, each of which manages a respective device class.

5. The system of claim 4, wherein the device class is a member of a set of device classes including at least one of:

"dev_enumerate," for designating devices with at least one occurrence managed by a particular driver, each of the occurrences managed by the particular driver on a particular node being individually enumerated;

"dev_nodespecific," for designating devices available on each node that are accessed locally and have a one-to-one relationship with the managing device driver on each node;

"dev_global," for designating devices that can be accessed by such device drivers from on any such node; and "dev_nodebound," designating devices that are accessed by a driver on a particular node and have a one-to-one relationship with the device driver.

6. The system of claim 4, wherein:

the device driver includes means for issuing device configuration information to the DDI including a class, if available, for the device;

the DDI has means for including the class, if available, in a map request to the DCS.

7. A method configured to provide global access to physical devices located on a computer cluster comprising a plurality of nodes, the method comprising the steps of:

storing in a device configuration system (DCS) physical device information for a plurality of the physical devices, the physical device information for each device in the plurality including a major number associated with a device type assigned to the physical device and other devices of same type, and a minor number that is globally unique for physical devices having the same major number;

the physical devices including a plurality of physical devices having a same major number associated therewith including at least one device having a first globally unique minor number associated therewith on a first node of the system and a second device having a second globally unique minor number associated therewith on a second node of the system;

a global file system responding to a request to access one such physical device issued from one of the nodes by requesting a DSO handle from a device configuration system (DCS);

the DCS determining in response to the access request an identity of a first device server object (DSO) associated with the requested physical device and returning to the global file system a reference to the first DSO and information corresponding to the major number and globally unique minor number associated with the requested physical device;

the global file system using the information returned by the DCS to generate a file descriptor and returning the file descriptor for subsequent use in accessing the requested physical device.

8. The method of claim 7, wherein the DCS is hosted on one of the nodes, the method further comprising the steps of:

each of a plurality of device drivers, when a new device of an appropriate type is attached to a respective node, issuing an attach message to a co-located device driver interface (DDI) indicating a local identifier (locid) of the new device being attached, each of the device drivers being configured to manage one type of physical device and being associated with a unique, major number;

the DDI, in response to the attach message, issuing a map request to the DCS for the unique global minor (gmin) number for the attached device, the map request indicating the major number and the locid of the device being attached;

the DCS, in response to the map request: (a) determining the gmin number, (b) returning the gmin number to the DDI, and (c) storing the gmin number, the major number and the gmin number;

the DDI associating the gmin number returned by the DCS and the major number with the attached device so that the attached device is accessible from the file system in response to a request to open the attached device.

9. The method of claim 7, wherein the DCS, file system and requested device are each on different nodes, further comprising the step of enabling applications on one node to communicate transparently with file objects co-located with the requested device on another node.

10. The method of claim 7, wherein the at least one DSO comprises a set of device server objects on each node of the cluster, each of which manages a respective device class.

11. The method of claim 10, wherein the device class is a member of a set of device classes including:

"dev_enumerate," for designating devices with at least one occurrence managed by a particular driver, each of the occurrences managed by the particular driver on a particular node being individually enumerated;

"dev_nodespecific," for designating devices available on each node that are accessed locally and have a one-to-one relationship with the managing device driver on each node;

"dev_global," for designating devices that can be accessed by such device drivers from on any such node; and "dev_nodebound," designating devices that are accessed by a driver on a particular node and have a one-to-one relationship with the device driver.

12. The method of claim 10, further comprising the steps of:

the device driver issuing device configuration information to the DDI including a class, if available, for the device; and the DDI including the class information, if available, in a map request to the DCS.

13. The method of claim 12, further comprising the steps of:

upon receiving the map request, the DCS consulting a local DSO associated with the same class; and the local DSO determining a global minor number to be assigned to the device being attached.

14. The method of claim 13, further comprising the step of:

when the class information is not provided by the device driver, accessing the corresponding device as if the corresponding device were of a dev_enumerate class including devices with at least one occurrence managed by a particular driver, each of the occurrences managed by the particular driver on a particular node being individually enumerated.

15. The system of claim 8, further comprising the step of:

when the open request is issued on a requested device identified by logical name, querying the file system to determine a dev_t value of the requested device;

and querying the DCS for the location and identification of a device with the dev_t value of the requested device.

16. The system of claim 15, wherein:

once it has received the location and identification of the requested device, the kernel issues an open request to a host node for the requested device.

17. The system of claim 16, further comprising:

file system components executing on the host node, including a special file system (SpecFS) configured to handle the open request by returning to the kernel a handle to a special file object that is associated with the requested device.

18. The system of claim 17, wherein:

the kernel returns a file descriptor that is mapped to the handle, through which the requested device can be accessed.

\* \* \* \* \*